US012599463B2

(12) United States Patent
Korten et al.

(10) Patent No.: US 12,599,463 B2
(45) Date of Patent: Apr. 14, 2026

(54) COLOR MANAGEMENT PROCESS FOR CUSTOMIZED DENTAL RESTORATIONS

(71) Applicant: Solventum Intellectual Properties Company, Maplewood, MN (US)

(72) Inventors: Malte Korten, Moorenweis (DE); Gioacchino Raia, Türkenfeld (DE); Bastian P. Kirchner, Fürstenfeldbruck (DE); Philipp Doebert, Seefeld (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 145 days.

(21) Appl. No.: 18/554,610

(22) PCT Filed: Apr. 5, 2022

(86) PCT No.: PCT/IB2022/053169
§ 371 (c)(1),
(2) Date: Oct. 9, 2023

(87) PCT Pub. No.: WO2022/219459
PCT Pub. Date: Oct. 20, 2022

(65) Prior Publication Data
US 2024/0374359 A1     Nov. 14, 2024

Related U.S. Application Data

(60) Provisional application No. 63/173,736, filed on Apr. 12, 2021.

(51) Int. Cl.
*A61C 13/00*     (2006.01)
*A61C 13/08*     (2006.01)
*G06T 19/20*     (2011.01)

(52) U.S. Cl.
CPC ........ *A61C 13/0004* (2013.01); *A61C 13/082* (2013.01); *G06T 19/20* (2013.01); *G06T 2219/2012* (2013.01)

(58) Field of Classification Search
None
See application file for complete search history.

(56) References Cited

U.S. PATENT DOCUMENTS 6,068,482 A     5/2000  Snow
7,341,450 B2    3/2008  Pye et al.
(Continued)

FOREIGN PATENT DOCUMENTS

EP     3068336 B1    8/2017
EP     2855120 B1    4/2018
(Continued)

OTHER PUBLICATIONS

International Search report for PCT International Application No. PCT/IB2022/53169, mailed on Aug. 15, 2022, 4 pages.
(Continued)

*Primary Examiner* — Zhengxi Liu

(57)     ABSTRACT

A computer-implemented method for generating a color 3D model for a dental restoration. The method receives color information, a color distribution map, and shape for a tooth. The color information is assigned to the color distribution map. The color information and the color distribution map are then combined with the shape to generate a digital color 3D model. The resulting 3D model includes volumes for different color materials for the restoration to provide for color transition zones, which can be 3D printed from the 3D model to made a corresponding restoration.

20 Claims, 8 Drawing Sheets

(56)                    References Cited

U.S. PATENT DOCUMENTS

|  |  |  |  |  |
|---|---|---|---|---|
| 8,858,227 | B2 | 10/2014 | Chishti et al. | |
| 9,161,823 | B2 | 10/2015 | Morton et al. | |
| 9,730,779 | B2 | 8/2017 | Kopelman et al. | |
| 10,010,387 | B2 | 7/2018 | Esbech et al. | |
| 10,245,126 | B2 | 4/2019 | Korten et al. | |
| 2005/0170315 | A1* | 8/2005 | Strobel | A61C 13/082 |
| | | | | 433/203.1 |
| 2013/0218531 | A1 | 8/2013 | Deichmann et al. | |
| 2017/0231731 | A1* | 8/2017 | Korten | G01J 3/508 |
| | | | | 433/203.1 |
| 2019/0125503 | A1* | 5/2019 | Krolikowski | B33Y 70/00 |
| 2019/0290361 | A1* | 9/2019 | Shalayev | A61B 34/10 |
| 2020/0022790 | A1* | 1/2020 | Fisker | A61C 13/0024 |
| 2020/0360109 | A1* | 11/2020 | Gao | A61C 9/0053 |

FOREIGN PATENT DOCUMENTS

| | | | |
|---|---|---|---|
| EP | 3215820 | B1 | 11/2018 |
| EP | 2991579 | B1 | 9/2019 |
| EP | 2793736 | B1 | 2/2020 |
| WO | 2015082300 | A1 | 6/2015 |

OTHER PUBLICATIONS

Al-Rimawi Ali et al: "3D Printed Temporary Veneer Restoring Autotransplanted Teeth in Children: Design and Concept Validation Ex Vivo",International Journal of Environmental Research and Public Health, vol. 16, No. 3, Feb. 11, 2019 (Feb. 11, 2019), p. 496,XP093234566, Switzerland ISSN: 1660-4601, DOI: 10.3390/ijerphl6030496 * abstract *.

* cited by examiner

COLOR MANAGEMENT PROCESS FOR CUSTOMIZED DENTAL RESTORATIONS

CROSS-REFERENCE TO RELATED APPLICATIONS

This application is a national-stage filing under 35 U.S.C. § 371 of International Patent Application No. PCT/IB2022/053169, filed 5 Apr. 2022, which claims the benefit of Provisional U.S. Patent Application No. 63/173,736, filed 12 Apr. 2021, the entire disclosure of each of which is incorporated herein by reference.

BACKGROUND

One of the main reasons for rework of dental restorations is that shade and aesthetics did not fit to the patient situation. The shade match and aesthetic of dental restorations also mean that aesthetic restorations tend to be more expensive than, for example, porcelain-fused-to-metal (PFM) or monolithic ones. Accordingly, a need exists for a digital workflow or software that produces a patient individualized and color customized dental restoration.

SUMMARY

A computer-implemented method for generating a color 3D model for a dental restoration includes receiving color information, a color distribution map, and shape for a tooth. The color information is assigned to the color distribution map. The color information and the color distribution map are combined with the shape, and a color 3D model is generated based upon the assigned color information and the color distribution map combined with the shape.

Another computer-implemented method for generating a color 3D model for a dental restoration includes extracting a color distribution map from a digital representation of a tooth and selecting boundaries of the color distribution map. The boundaries of the color distribution map are combined with the digital representation and matched with a digital 3D model of the tooth. An outer surface of the digital 3D model is reduced to accommodate segments for the color distribution map, and the outer surface of the digital 3D model is converted to a digital 3D volumetric model.

The result of these methods can be a 3D model with volumes for different color materials for the restoration and which can be used to make the restoration via 3D printing or other processes such as milling.

DETAILED DESCRIPTION

Processes for generation of color customized restorations require color and shape information in a format that can be used to generate the restorations. The process described herein can generate such data from different measurement sources and generate such color customization files in an automated or semi-automated manner. This process can thus be used for a full color customized digital workflow for color processing of ceramics and composites, or other materials. The process combines color, a color distribution map, and shape to generate a three-dimensional (3D) model for a full customized dental restoration, for example a crown, veneer, bridge, or other restoration. The 3D model can include segments that can be used to additively manufacture (3D print) particular materials. The 3D model can also be used to make the customized restoration via other processes such as milling, or a combined/hybrid process (e.g., 3D printing of a customized layered block and milling of the desired restoration). Further processes can include molding, molding and pressing for ceramics, layering of glass ceramics, and milling with grinding.

Figure 1:
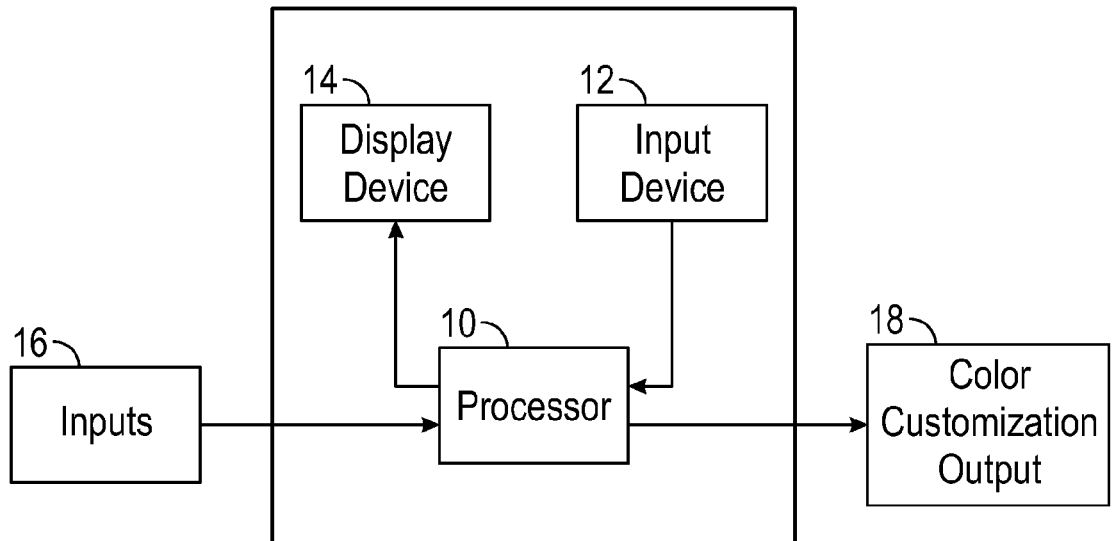
FIG. 1 is a block diagram of a system for designing customized dental restorations.

FIG. 1 is a block diagram of a system for designing customized dental restorations. The system includes a processor 10 receiving inputs 16, described below, to make a customized dental restoration and provide a color customization output 18. The system can also include an electronic display device 14, such as a liquid crystal display (LCD) device, and an input device 12 for receiving user commands or other information. This system can be implemented with, for example, a desktop, notebook, or tablet computer.

Figure 2:
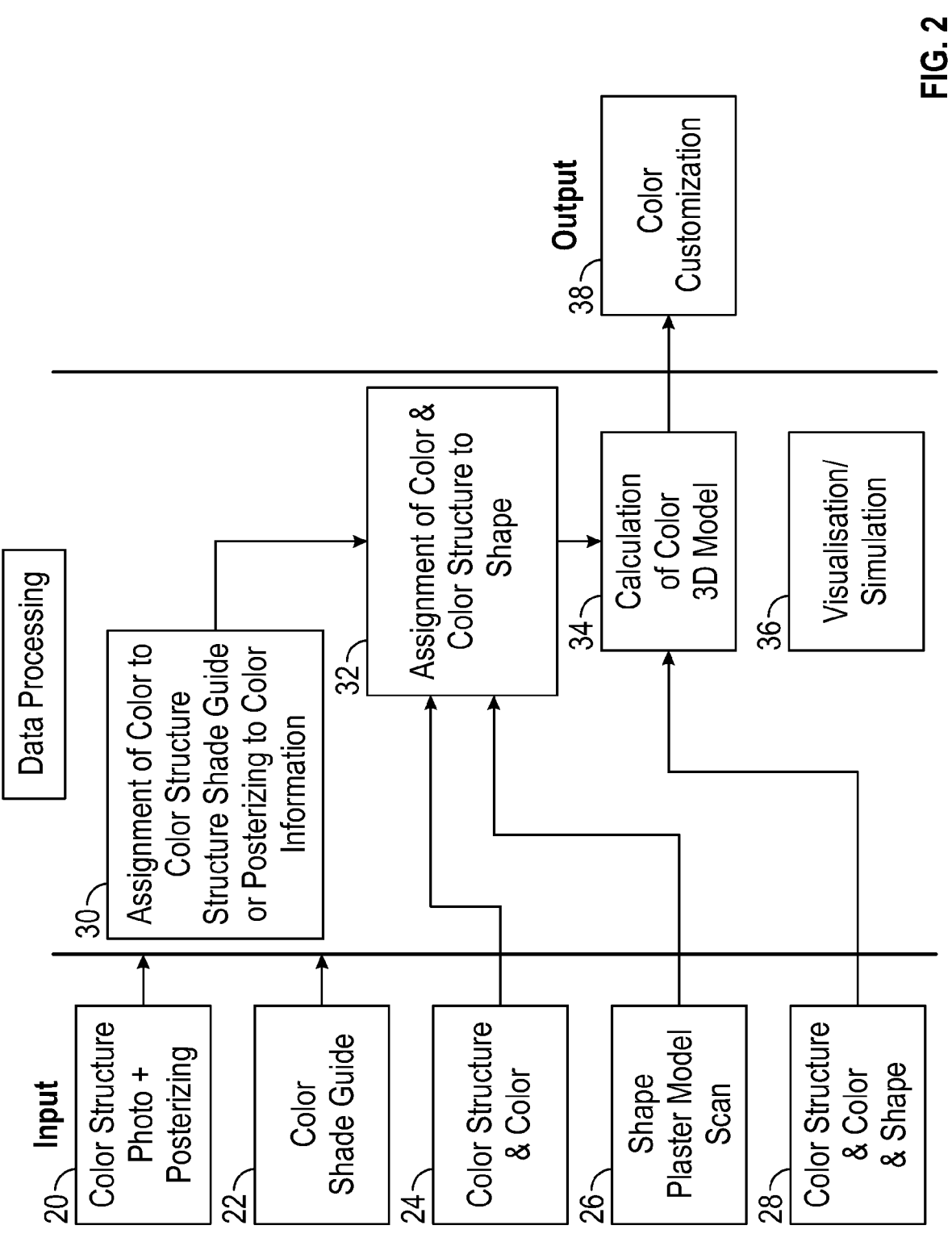
FIG. 2 is a diagram of a process for designing customized dental restorations.

FIG. 2 is a diagram of a process for designing customized dental restorations using a full digital color workflow. This process including the steps further described below can be implemented in software or firmware, for example, for execution by a processor such as processor 10. This process can also be automated through the use of a processor operating under software control.

The data processing is based upon different input measurement data, such as the following: a photograph with posterizing 20, a color shade guide 22; a color distribution map with color 24; shape from a physical (plaster) model or intra-oral scan 26; and a color distribution map with color and shape 28. The processing compiles the gathered information into a 3D model that contains geometry and color information as follows: assignment of color to a color distribution map using a shade guide or posterizing (step 30); assignment of color and the color distribution map to shape (step 32); calculation of a digital color three-dimensional (3D) model (step 34); and optionally visualization and simulation (step 36). The result is color customization output 38 file or data structure containing the digital color 3D model, and the structure of such a file or data structure can depend upon the type of individualization and the production process. An example is vestibular veneering—for dental technicians a common kind to process to generate aesthetic restorations manually.

Figures 3, 4:
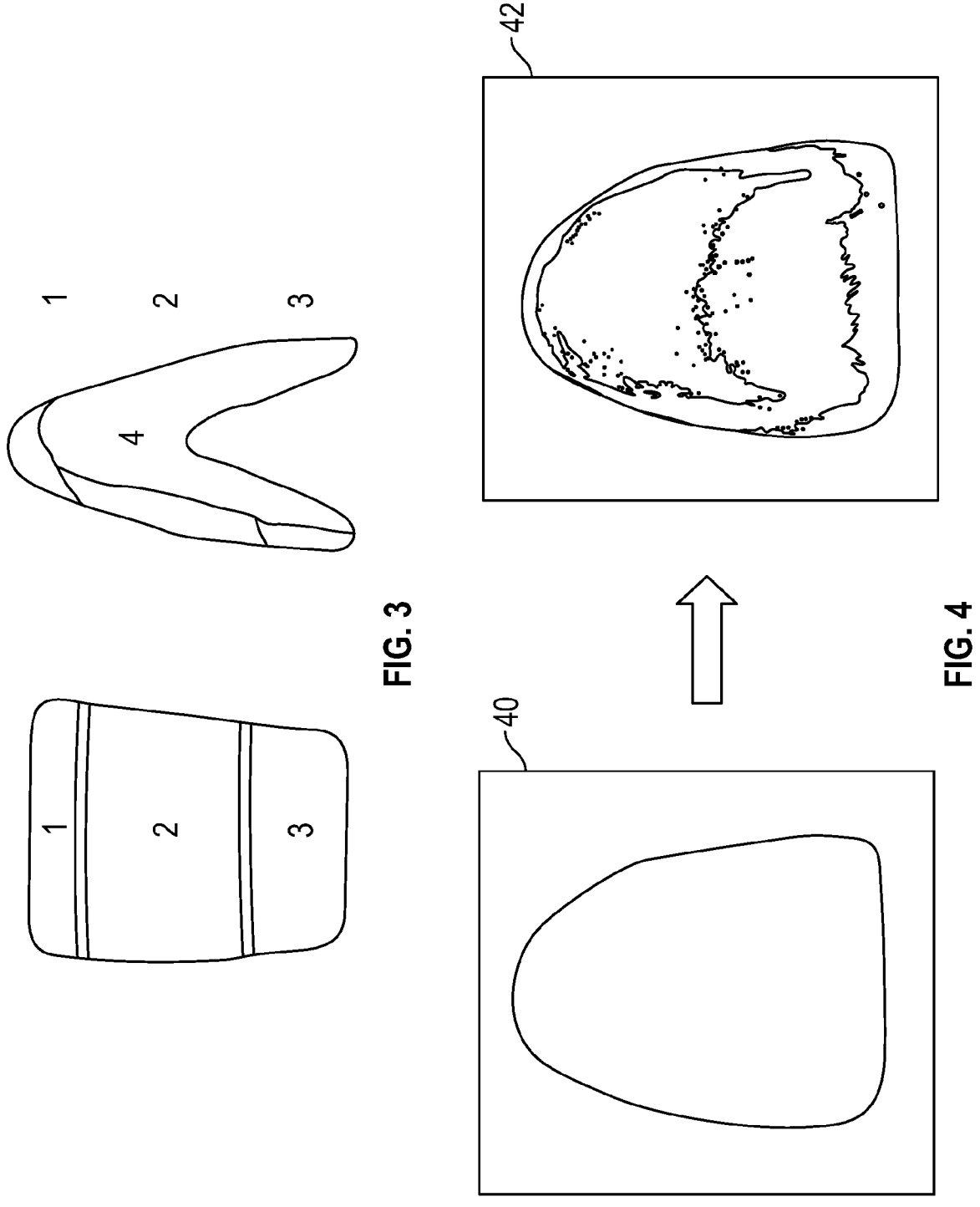
FIG. 3 illustrates vestibular veneering.
FIG. 4 illustrates posterizing a color distribution map for a dental restoration.

FIG. 3 illustrates vestibular veneering. The part 4 is a vestibular reduced coping with different colored parts (1,2,3) on the vestibular side. The transition zone between the color layers is characterized by an inclined layer thickness from the one color layer and a declining layer thickness from the second color layer material. This results to the observer as a smooth transition between the layers. There are other layering techniques for higher aesthetic individualization that can also or alternatively be used.

The actual appearance of the resulting restoration tooth depends on the color distribution map and the actual color. To obtain a natural appearance and the correct color on each segment of the restoration tooth, the process or workflow has to take in respect, that the color is depends upon the color of the tooth stump, the color within the layers, and the thickness of the layers and their translucency properties. Based on the information of the desired color per color segment, the thickness of each layer and the needed color of the layer can be estimated. For example, a desired A1 color results from a combination of the coping color ND2, a layer thickness of 0.4 mm and an LT A1 veneer material. In this case, 0.4 mm layer thickness will be used to obtain a A1 color on the appropriate color segment. Other color segments can be handled with the same approach. Color transition zones can be used to prevent an abrupt change of color by a non-perpendicular cut between the veneer (e.g., outer surface) materials. Depending upon the size of the color transition zone, the corresponding cutting angle can be determined or set.

To generate a digital 3D model of a vestibular veneer structure out of the gathered data, the following process can be used, which can be automated using software processing via processor 10.

Step 1. FIG. 4 illustrates posterizing a color distribution map and extracting the color distribution map for a tooth 40 for a dental restoration. In particular, this process posterizes a digital photograph (photo), or other digital representation, of a tooth to extract the color distribution map of the tooth as described in, for example, U.S. Pat. No. 10,245,126. The result (image 42) provides the color distribution map for tooth 40, where the color distribution map is location information of colors for the tooth.

Figure 5:
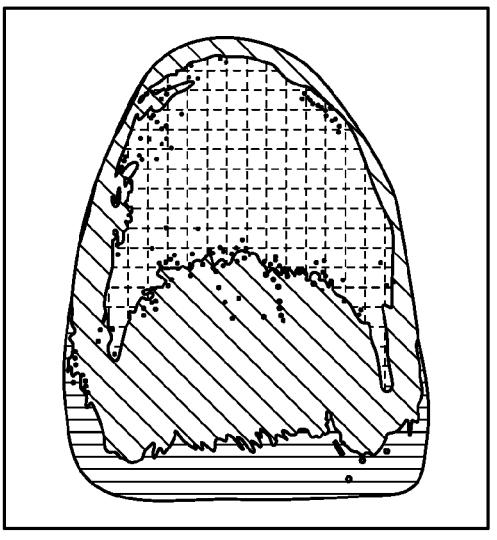
FIG. 5 illustrates replacement of gray scale values with false colors for posterizing.

Step 2 (optional). FIG. 5 illustrates optional replacement of gray scale values with false colors for posterizing. In this optional case, the posterization process uses a digital photograph to extract color information and optionally assign false colors (e.g., blue, green, yellow as represented by the different types of cross-hatching) such that the gray scale color differences of the tooth are more visually apparent.

Figure 6:
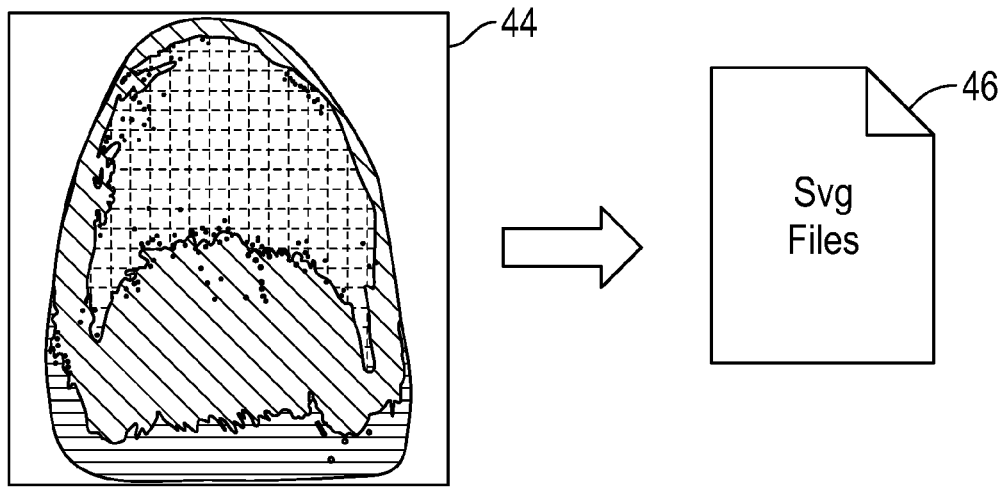
FIG. 6 illustrates selection of boundaries of color segments and exporting them in a scalable vector graphics file.

Step 3. FIG. 6 illustrates selection of boundaries of color segments (image 44) in the digital posterized tooth (shown in FIGS. 4 and 5), or other posterized digital representation of the tooth, and exporting them in a scalable vector graphics (SVG) file 46 or other type of data structure. The boundaries can be determined by detecting the transitions between colors in the color distribution map, the locations of gray scale values or false colors.

Figure 7:
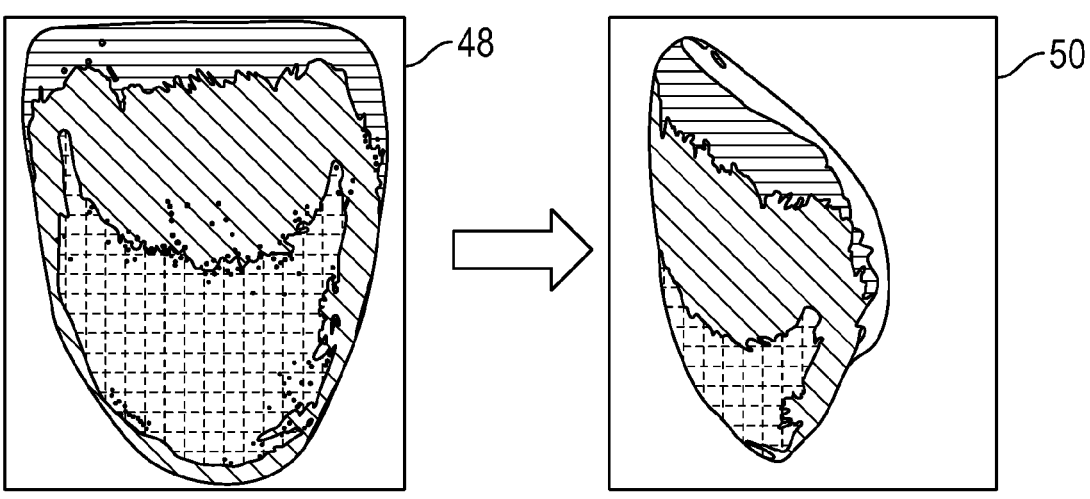
FIG. 7 illustrates applying a color distribution map as a texture on a tooth.

Step 4 (optional). FIG. 7 illustrates applying a color distribution map (image 48) as a texture (image 50) on the digital posterized tooth shown in FIGS. 4 and 5. The texture is optional and provides a combination of a digital 3D shape with the color distribution map.

Figure 8:
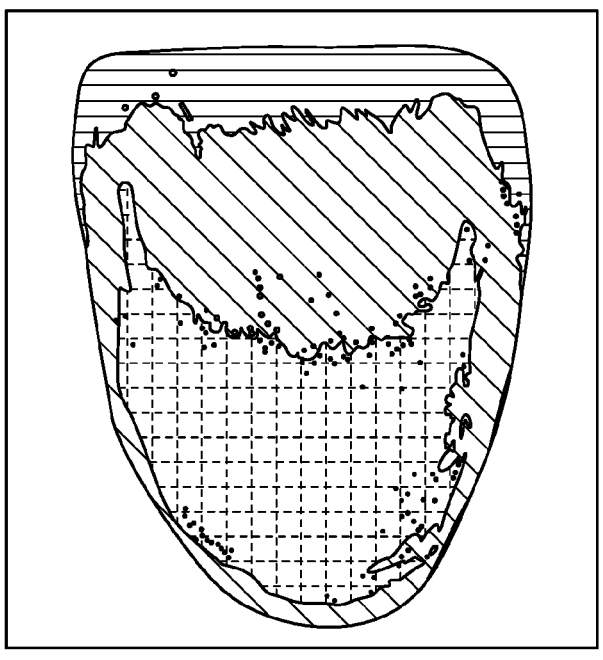
FIG. 8 illustrates attaching the scalable vector graphics file to the scene for the dental restoration.

Step 5. FIG. 8 illustrates attaching the SVG file to the scene for the dental restoration, in particular combining the SVG file with boundaries of the color segments in the digital posterized tooth.

Figure 9:
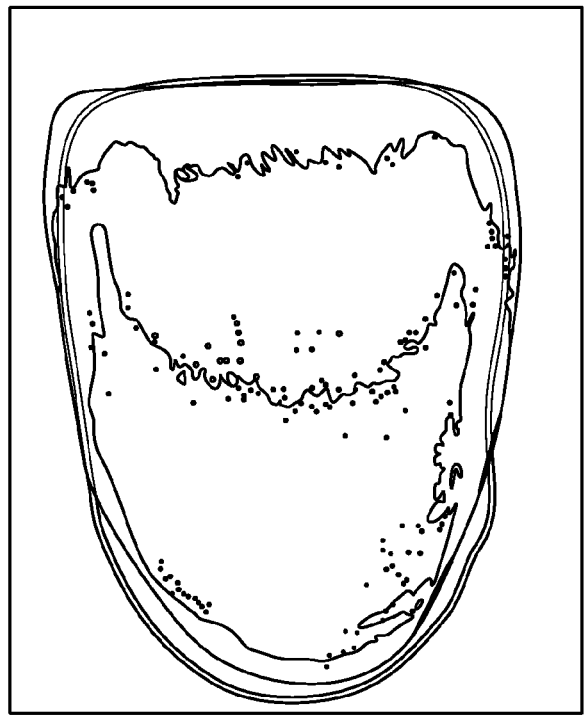
FIG. 9 illustrates matching of scalable vector graphics splines to 3D geometry.

Step 6. FIG. 9 illustrates matching of SVG file splines to digital 3D geometry or shape data of the tooth. The 3D shape data can be obtained from scanning a physical model of teeth or from intra-oral scanning of teeth to generate a corresponding digital 3D model of the tooth. The SVG splines are obtained as shown in FIG. 6, and the splines from the posterized photo or digital representation of the tooth are matched with corresponding locations in the digital 3D model of the tooth, as shown in FIG. 9.

Figure 10:
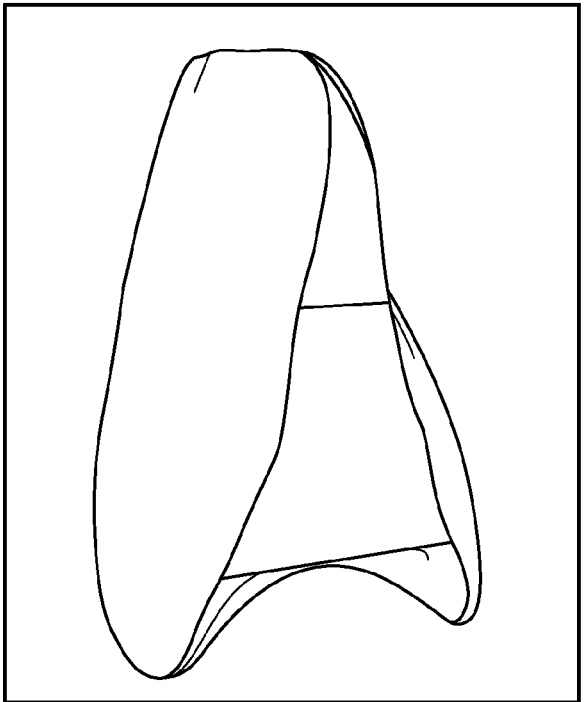
FIG. 10 illustrates reduction of the outer surface.

Step 7. FIG. 10 illustrates reduction of the outer surface from the digital 3D model shown in FIG. 9 and which is performed to accommodate the color segments. The outer surface is reduced by an amount desired or necessary to accommodate the color segments representing different materials for the restoration, for example reduction to accommodate a 0.4 mm layer thickness for an A1 color as noted above.

Figure 11:
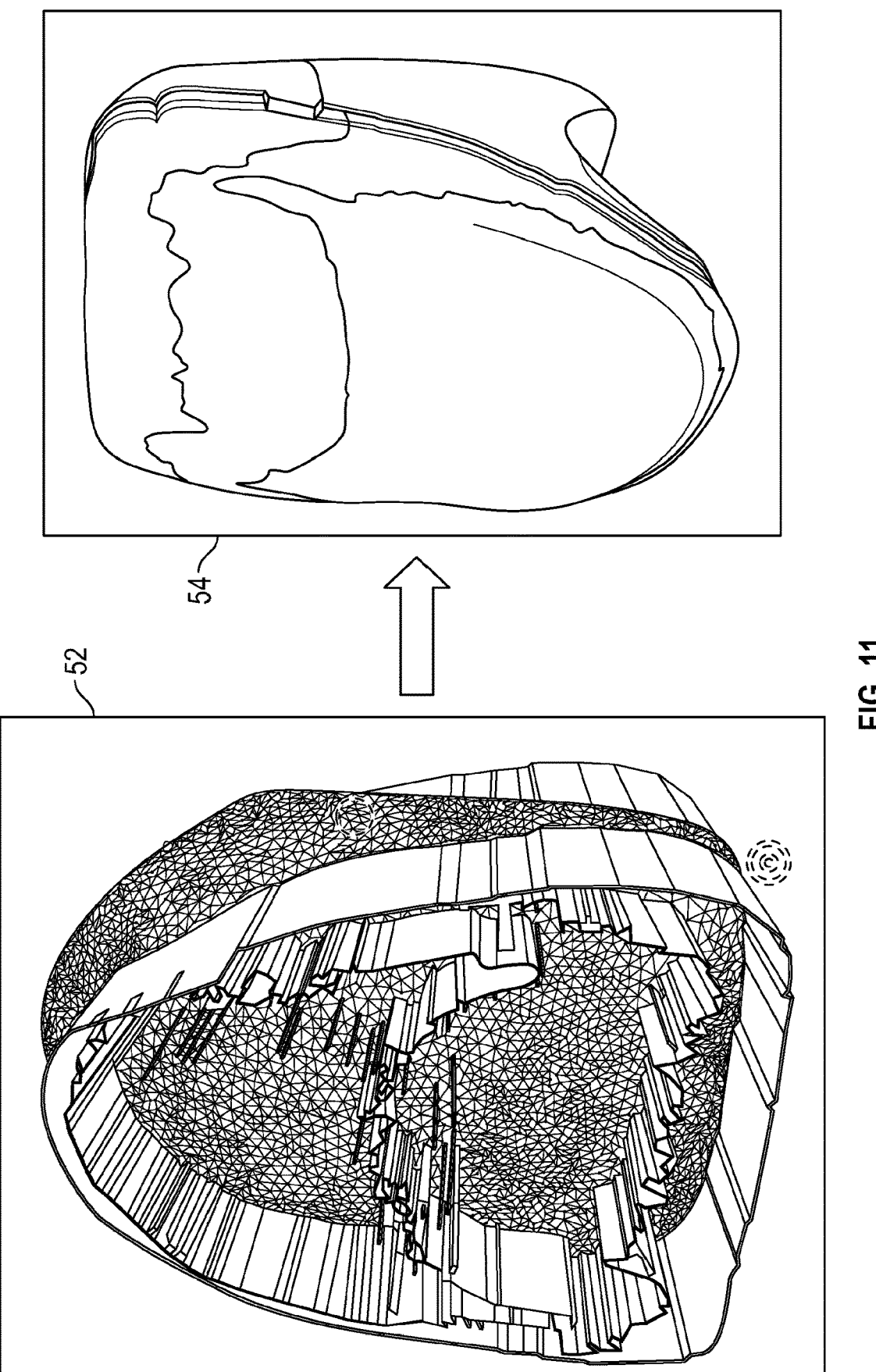
FIG. 11 illustrates cutting the outer surface with extruded scalable vector graphics paths.

Step 8. FIG. 11 illustrates cutting the outer surface of the digital 3D model (shown in FIG. 9) with extruded SVG paths to convert the digital surface model (image 52) to a digital volumetric 3D model (image 54). In particular, the SVG paths are extruded through the digital 3D surface model to create volume and a resulting digital 3D volumetric model. The SVG paths can be extruded in, for example, a non-orthogonal direction to the surface of the digital 3D model. The volume of the digital 3D model can then be used, for example, to 3D print a corresponding restoration. The volume of the 3D model can also be a source for the best fit to find an optimal position of parts in a complex shaded mill blank. In particular, one approach is to use the designed color structure to find, via a best fit algorithm, the closest possible position within a complex layered mill blank to mill out the best possible color fit for an aesthetic dental restoration.

Figure 12:
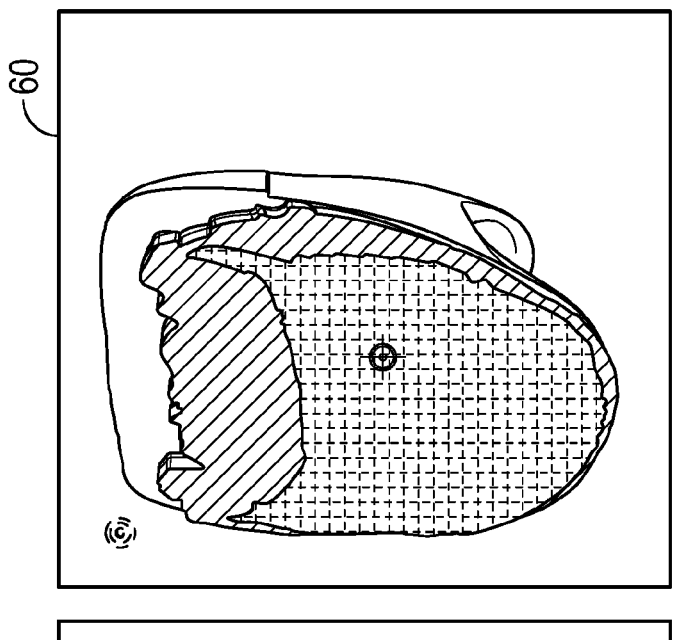
FIG. 12 illustrates the resulting 3D model with volumes for different color materials to provide for color transition zones.
Figure 12:
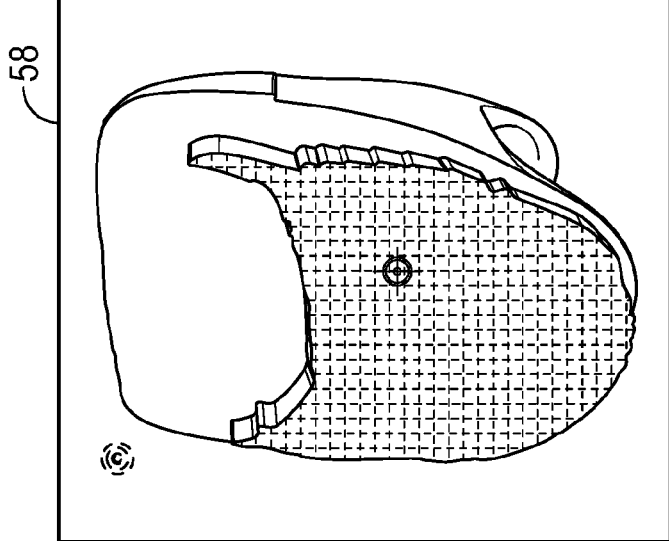
Figure 12:
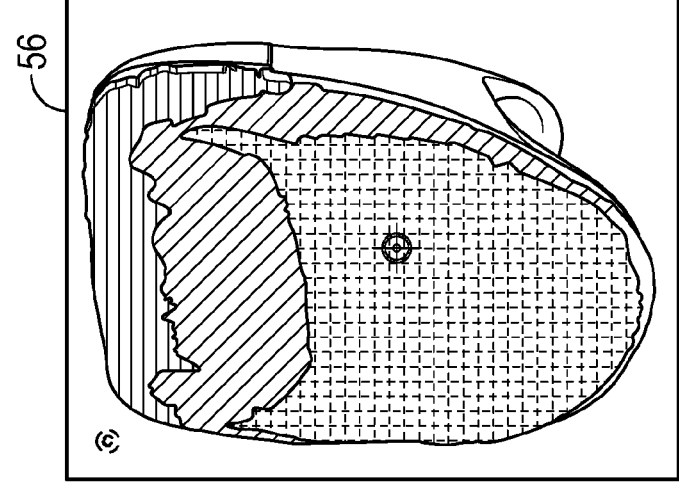

FIG. 12 illustrates the resulting digital color 3D model with volumes for different color materials to provide for color transition zones, for example three volumes (image 56) for three different colors, one volume (image 58) for one color, and two volumes (image 60) for two different colors. The volumes for the colors are represented by the different cross-hatching in the images. This digital 3D model can be used to 3D print the corresponding restoration.

Table 1 summarizes this process to make a digital 3D model for a customized color dental restoration. These steps can be implemented in software for execution by a processor to automatically perform the steps to generate the digital 3D model from the inputs. This process can optionally include user input, for example a user entering information via input device 12 and viewing any of the digital representations or digital 3D models via display device 14.

TABLE 1

| Process |
| --- |
| Step 1  Extract a color distribution map from a digital representation of a tooth. |
| Step 2  Optionally replace gray scale values of the color distribution map with false colors. |
| Step 3  Select boundaries of the color distribution map in the digital representation. |
| Step 4  Optionally apply the color distribution map as texture on the digital tooth. |
| Step 5  Combine boundaries of the color distribution map with the digital representation. |
| Step 6  Match the boundaries of the color distribution map with a digital 3D model of the tooth and define cutting angles to generate color transition zones. |

TABLE 1-continued

| Process |
|---|
| Step 7 | Reduce the outer surface of the digital 3D model to accommodate color segments for the colors. |
| Step 8 | Convert the outer surface of the digital 3D model to a corresponding digital 3D volumetric model. |

The invention claimed is:

1. A computer-implemented method for generating a color 3D model for a dental restoration, comprising steps of executed by a processor:

receiving color information, a color distribution map, and shape for a tooth;

assigning the color information to the color distribution map;

combining the assigned color information and the color distribution map with the shape; and generating a digital color 3D model based upon the assigned color information and the color distribution map combined with the shape, wherein the 3D model includes one or more segments corresponding to different color materials for the restoration and includes one or more transition zones between the color layers, each transition zone characterized by an inclined layer thickness from a first color layer and a declining layer thickness from a second color layer.

2. The method of claim 1, wherein receiving step comprises posterizing a photo of the tooth to extract the color distribution map.

3. The method of claim 2, wherein the posterizing further comprises replacing gray scale values of the color distribution map with false colors.

4. The method of claim 1, wherein the assigning step comprising selecting boundaries of segments of the assigned color information in the color distribution map and exporting the boundaries into a data structure, and the boundaries for the segments are represented by splines.

5. The method of claim 4, further comprising attaching the splines to the color distribution map.

6. The method of claim 5, wherein the combining step comprises matching the splines to the shape.

7. The method of claim 4, wherein the combining step comprises reducing a surface of the shape to accommodate the segments of the assigned color information.

8. The method of claim 7, wherein the generating step comprises converting the surface of the shape to a corresponding volumetric model.

9. The method of claim 8, wherein the converting step comprises extruding the splines through the surface of the shape.

10. A system for generating a color 3D model for a dental restoration, comprising a processor configured to:

receive color information, a color distribution map, and shape for a tooth;

assign the color information to the color distribution map;

combine the color information and the color distribution map with the shape; and generate a digital color 3D model based upon the assigned color information and the color distribution map combined with the shape, wherein the 3D model includes one or more segments corresponding to different color materials for the restoration and includes one or more transition zones between the color layers, each transition zone characterized by an inclined layer thickness from a first color layer and a declining layer thickness from a second color layer.

11. The system of claim 10, wherein the processor is further configured to posterize a photo of the tooth to extract the color distribution map.

12. The system of claim 11, wherein the processor is further configured to replace gray scale values of the color distribution map with false colors.

13. The system of claim 10, wherein the processor is further configured to select boundaries of segments of the assigned color information in the color distribution map and export the boundaries into a data structure, and the boundaries for the segments are represented by splines.

14. The system of claim 13, wherein the processor is further configured to attach the splines to the color distribution map.

15. The system of claim 14, wherein the processor is further configured to match the splines to the shape.

16. The system of claim 13, wherein the processor is further configured to reduce a surface of the shape to accommodate the segments of the assigned color information.

17. The system of claim 16, wherein the processor is further configured to convert the surface of the shape to a corresponding volumetric model.

18. The system of claim 17, wherein the processor is further configured to extrude the splines through the surface of the shape.

19. The system of claim 18, wherein the processor is further configured to extrude the splines in a non-orthogonal direction to the surface of the shape.

20. A computer-implemented method for generating a color 3D model for a dental restoration, comprising steps of executed by a processor:

extracting a color distribution map from a digital representation of a tooth;

selecting boundaries of the color distribution map in the digital representation;

combining the boundaries of the color distribution map with the digital representation;

matching the boundaries of the color distribution map with a digital 3D model of the tooth, wherein the matching also includes defining one or more cutting angles to generate one or more color transition zones;

reducing an outer surface of the digital 3D model to accommodate segments for the color distribution map; and converting the outer surface of the digital 3D model to a digital 3D volumetric model.

* * * * *